United States Patent [19]
Monroe

[11] 3,736,428
[45] May 29, 1973

[54] DETECTING WITH ULTRAVIOLET LIGHT

[75] Inventor: John N. Monroe, Waco, Tex.

[73] Assignee: Thompson Ramo Wooldridge Inc., Euclid, Ohio

[22] Filed: Mar. 27, 1958

[21] Appl. No.: 724,473

Related U.S. Application Data

[63] Continuation-in-part of Ser. No. 628,824, Dec. 17, 1956, abandoned.

[52] U.S. Cl. .................. 250/71 G, 340/4 R, 356/51
[51] Int. Cl. ............................................. G01n 21/00
[58] Field of Search .................... 250/71, 83, 83 A, 250/83 B, 83 C, 83 D, 83 E, 71, 71 SC, 71 G, 83.3 IR, 83.6 S, 83.3 UV, 71.5, 71 G, 833, DIG. 44, 71 R; 356/51; 340/4 R

[56] References Cited

UNITED STATES PATENTS

| | | | |
|---|---|---|---|
| 2,269,889 | 1/1942 | Blau | 250/716 |
| 2,423,885 | 7/1947 | Hammond | 250/83.3 IR |
| 2,442,298 | 5/1948 | Liston | 250/83.3 IR |
| 2,656,471 | 10/1953 | Herzog | 250/71 G |
| 1,816,047 | 7/1931 | Keuffel | 250/217 |
| 2,334,475 | 11/1943 | Claudet | 250/71 |
| 2,412,165 | 12/1946 | McDermott | 250/83.3 |
| 2,497,129 | 2/1950 | Liston | 250/83.3 |
| 2,206,922 | 7/1940 | Smith | 250/83.3 A |
| 2,263,108 | 11/1941 | Stuart | 250/83.3 A |
| 2,577,814 | 12/1951 | Saunderson | 250/226 |
| 2,617,945 | 11/1952 | Lord, Jr. | 250/83.6 |
| 2,767,326 | 10/1956 | Stratford | 250/83.6 |
| 2,710,924 | 6/1955 | Morrison et al. | 250/71 |

Primary Examiner—Richard A. Farley
Attorney—Stevens, Davis, Miller & Mosher

[57] ABSTRACT

1. A method of detection in the presence of ambient light comprising the steps of beaming a source of ultraviolet light pulsed at a predetermined frequency upon a surface under scrutiny from an aircraft, scanning the beam of ultraviolet light in a direction perpendicular to the travel of said aircraft, detecting visible light emanating from said surface, and eliminating the effect of light whose intensity varies at a rate below said predetermined frequency from light detected in said step of detecting visible light.

6 Claims, 5 Drawing Figures

Patented May 29, 1973

INVENTOR
John N. Monroe

BY Stevens, Davis, Miller & Mosher
ATTORNEYS

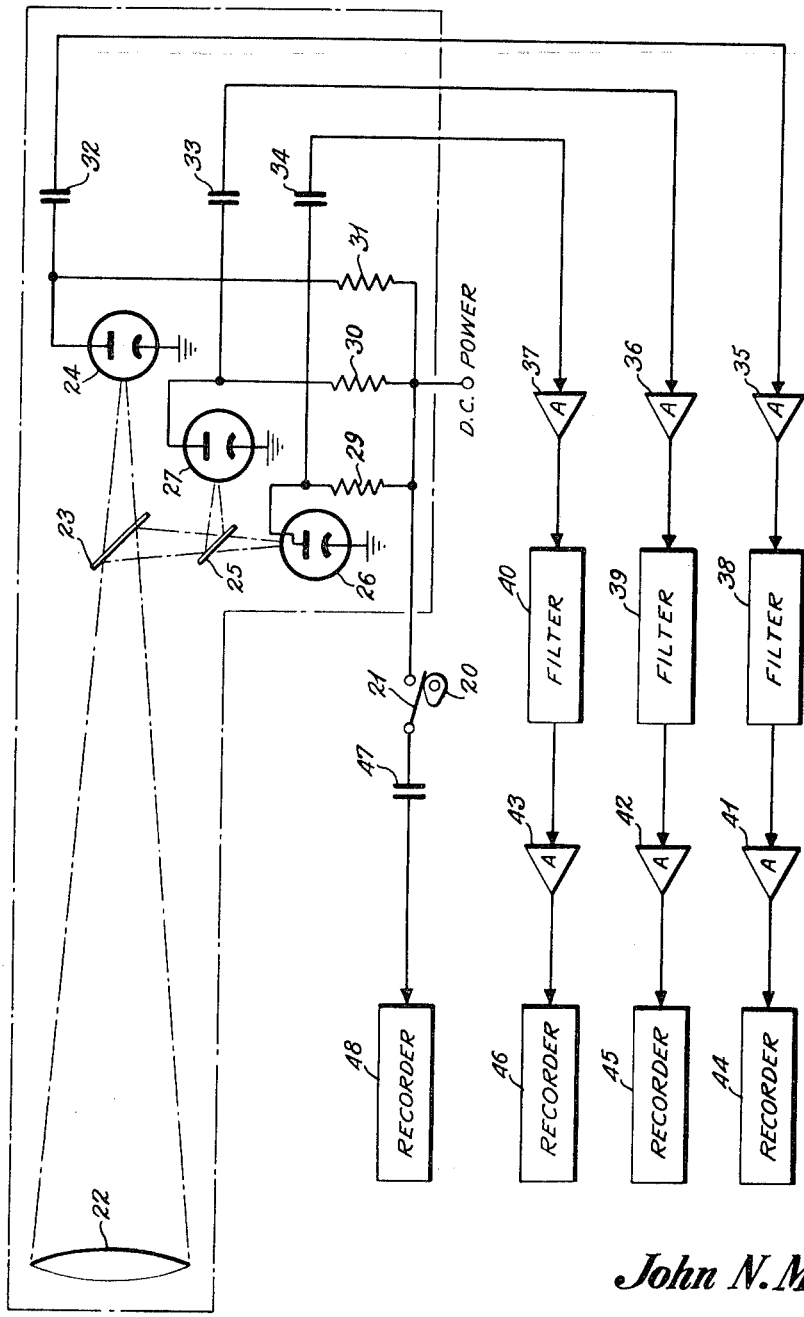

DETECTING WITH ULTRAVIOLET LIGHT

This invention relates to a new and improved aerial detection system and airborne detection apparatus which makes use of the fluorescent properties of the surface of the earth. This invention is disclosed in the copending application, Ser. No. 628,824 of John N. Monroe, filed Dec. 17 1956, now abandoned, and the present application constitutes a continuation-in-part of the copending application, Ser. No. 628,824 which, accordingly, is hereby incorporated by reference.

A preferred embodiment of this invention relates to a new and improved method of prospecting which analyzes the fluorescent properties of the surface of the ground over a large area and provides a permanent record of the analysis.

Prior to this invention, prospecting has been done by determining the fluorescent quality of a fairly large surface area by taking samples from different locations and analyzing the samples by irradiating them with ultraviolet light and observing the fluorescense. The present invention improves over this method by making the prospecting feasible from an airplane traveling at a high rate of speed. The area that can be economically prospected can be increased multifold and the results are quickly and easily obtained.

Generally, according to the invention, a beam of pulsed ultraviolet light is operated from an aircraft at night to activate fluorescent outcroppings on the surface of the ground. This fluorescent material, as a result of being impinged by the ultraviolet light, emits a pulsed visible light. The visible light is picked up by the receiving unit and analyzed and recorded. By scanning the surface with the ultraviolet beam in a direction normal to the travel of the aircraft, a large surface area can be covered. The beam is pulsed so that the visible light given off by the fluorescent material will be distinguishable from other visible light such as moonlight. The optical analyzer divides a light into its three spectral regions, and the intensity of the light in each of these regions is continuously recorded as the ultraviolet beam scans the surface.

This method of prospecting has a great utility in finding outcroppings of valuable ore deposits. For example, the minerals hydrozincite and smithsonite are fluorescent and these minerals are formed from the weathering of sphalerite which is the only important ore of zinc. Mercury deposits are frequently capped by an exposed crust of calomel which is a highly fluorescent material. The fluorescent mineral scheelite, by far the most important ore of tungsten in the United States, frequently persists to the surface as it is a very stable mineral. Another mineral which fluoresces is autunite which is the most common uranium mineral in the oxidized secondary deposits in igneous rocks of arrid regions. All of these minerals fluoresce in different colors so by analyzing the intensity of the different spectral regions, the particular mineral that is fluorescing can be determined. All of these and other fluorescent minerals can be quickly and easily located by using the prospecting method and apparatus of this invention. As these minerals occur on the surface in outcroppings, they give a definite indication of a vein of a valuable ore deposit.

According to another embodiment of this invention there is provided an improved method detecting submarines by detecting fluorescent effects of submarine wakes.

The upper 100 meters of ocean water is populated by minute plankton or floating forms of life which are fluorescent when subjected to ultra-violet light. These plankton are numerous enough in this upper ocean water to color the various parts of seas the various characteristic colors that they have. Whenever a submarine disturbs the waters of the ocean as it travels below the surface, it will affect the fluorescent properties of the surface water and contents.

By irradiating the water surface with the use of a pulsed ultraviolet beam, the pattern of fluorescence on the surface of the ocean and the path of a submarine can be determined. The information utilized from this ultraviolet excitation of the wake includes both the patterns observable due to the varying intensities of fluorescence of the ocean surface under ultraviolet and also the colors of this fluorescence. The intensities of fluorescence of this ocean surface would vary due to the population and types of plankton present in the upper water whereas the colors would vary due to the relative numbers of various types of plankton in these surface waters. These factors in turn are effected by the disturbance which is set up by a submarine in motion below surface.

The following figures illustrate the method and the detailed operation and structure of the detecting apparatus of this invention:

FIG. 5 shows the details of the optical analyzer including circuitry for converting the optical signals into electrical signals and for applying these signals to recorders.

Figure 1:
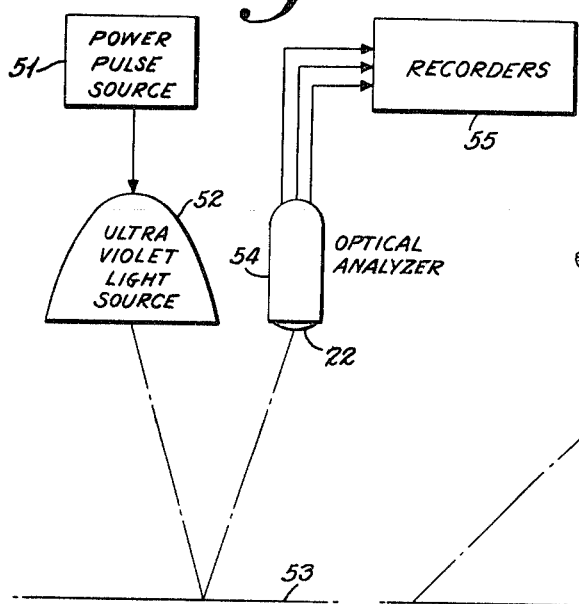
FIG. 1 is a block diagram of the overall operation of the detecting device.

In FIG. 1 there is shown a block diagram indicating the overall operation of the invention. Power is applied to the ultraviolet light source 52 from the source 51. The power applied is a pulse source at at 1,000 cycles per second. The ultraviolet light source 52 comprises a 100 watt mercury discharge tube, a filter to eliminate the visible light surrounding the tube, and an ultraviolet reflector. Upon receiving the pulse power from the source 51, the ultraviolet light source 52 emits a pulsed beam of ultraviolet light which is directed toward the surface of the ground or water 53 which is under scrutiny. Upon striking the surface, the ultraviolet light beam activates the impinged fluorescent material causing it to give off pulsed visible light at 1,000 cycles per second. Part of this visible light is collected by the lens 22 and detected by the optical analyzer 54 which separates the light into its three color spectrums, red, yellow and blue. The light received in each particular color spectrum is converted into an electrical signal, the magnitude of which corresponds to the intensity of the light received. These signals are recorded by the recorders 55. In this manner, a permanent record is made of the intensity of the blue, red and yellow light as collected by the lens 22.

Figure 2:
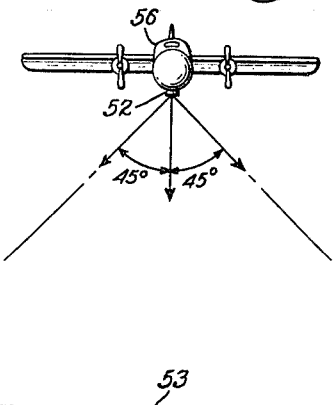
FIG. 2 is a diagram showing the device mounted on an aircraft illustrating the scanning operation of the ultraviolet beam.

FIG. 2 shows the apparatus mounted on an airplane and illustrates the scanning operation. The ultraviolet light source is oscillated through an angle of 90°, 45° from normal on each side, at a rate of 1 cycle per second. The light beam scans across at a continuous rate for about nine-tenths of a second from left to right and then upon reaching the ultimate angle of 45° from normal on the right side, the ultraviolet source is brought back quickly to the starting angle again, which is 45° from normal on the left side. The return takes about one-tenth of a second so the whole cycle takes about 1 second. The scanning operation is continuously repeated and the next path across the ground 53 will be contiguous to the preceding path and thus the entire area enclosed within the 45° lines in impinged by the ultraviolet beam as the aircraft moves forward. In the preferred embodiment, the aircraft is to fly at an altitude of about 2,000 feet. Therefore, the distance across the scanned surface between two ultimate points of the scan is about 4,000 feet. The ultraviolet beam is focused on an area with a diameter of greater than 50 yards. The aircraft therefore should fly at about 100 m.p.h. in order that the scanned paths be contiguous.

Figure 3:
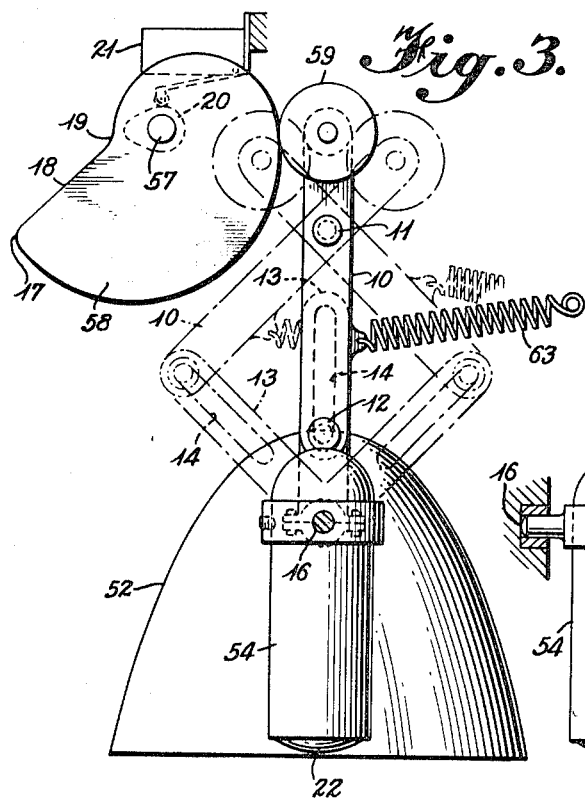
FIGS. 3 and 4 show details of the oscillating mechanism for causing the beam of light to scan.
Figure 4:
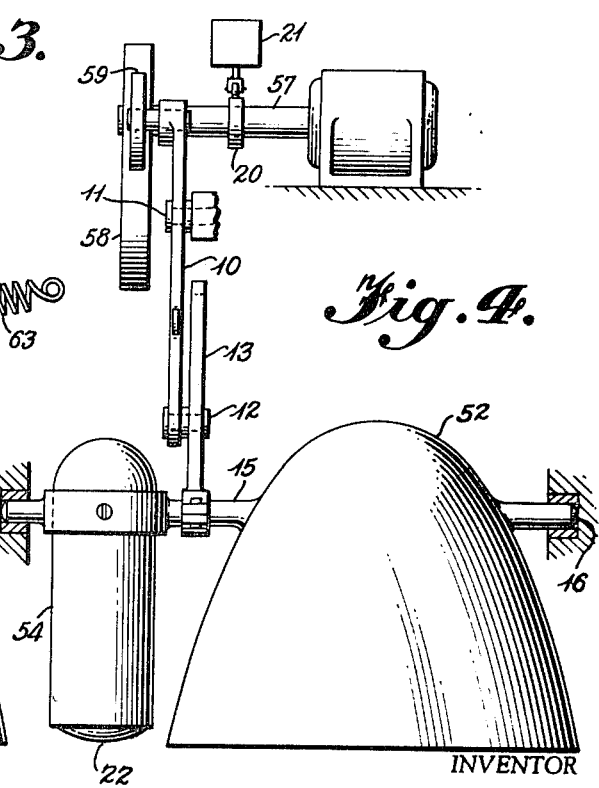

FIGS. 3 and 4 illustrate in detail the apparatus for performing the scanning function. The shaft 57 is rotated at a constant rate of one cycle per second rotating the cam indicated generally by the numeral 58. The cam 58 co-acts with the roller 59 which is mounted on the arm 10. The arm 10 is pivoted about the bearing 11 which is fixed with respect to the aircraft. As the cam 58 rotates, it will cause the roller 59 to proceed from its left ultimate position to its right ultimate position, as indicated by dashed lines, pivoting at the point 11 as it moves. On the lower end of the arm 10 is mounted a bearing member 12. This bearing member 12 co-acts with a second arm 13 which is slotted with a longitudinal slot 14 to receive the bearing member 12. As the arm 10 is rotated from its left-hand position to its right-hand position, it rotates the arm 13 from its left-hand position to its right-hand position with the bearing member 12 sliding in the slot 14 as the arms rotate. The arm 13 is pivoted about the shaft 15 which is mounted fixed to the arm 13. The shaft 15 rotates through an angle of 90° as a result of the rotation of the arm 13. The shaft 15 is mounted in bearings 16, about which the arm 13 pivots. Mounted fixed to the shaft 15, so as to rotate therewith, is the ultraviolet source 52, and the optical analyzer 54. As the cam 58 rotates, the roller 59 will gradually be moved from its left-hand position through the center position to its right-hand position. When the roller 59 gets to its right-hand position, it will be in contact with that part of the cam surface indicated by the numeral 17. The arm 10 is biased to its left-hand position by the spring 63. As the cam continues to turn, the roller 59 will be quickly brought back by the spring 63 over the cam surface 18 to its left-hand position until it is in contact with the cam surface 19. In this manner, the ultraviolet light source 2 and the optical analyzer 54 are oscillated together, and the system is made to scan, gradually moving from the left to the right until it reaches the extreme right-hand position, whereupon it is quickly brought back to the starting point and again cammed across at a gradual rate. The roller takes about nine-tenths of a second moving from left to right, and one-tenth of a second moving from right to left. The optical analyzer 54 and the ultraviolet light source 52 are mounted on the shaft 15, and the pivot point of the arm 13 is coaxial with the shaft 15. The ultraviolet source is so positioned on the shaft 15 that the mercury vapor tube is mounted right in the pivot axis. Also, in the optical analyzer 54, reflecting filters which separate the light and the photo-multiplier tubes are mounted approximately coaxially with the pivot so as to reduce the oscillatory motion of the delicate parts of the analyzer and the ultraviolet source, and thereby lessen the danger of damaging these parts due to the rapid return of the system in the scanning operation.

Mounted on the shaft 57, which turns the cam 58, is a second cam member 20. This cam member is for the purpose of closing a switch 21 and is mounted so as to close this switch 21 at the time when the roller 59 is in its left-hand position, or when the ultraviolet light beam impinges the surface area 60 (see FIG. 2) at the left ultimate angle. At this time, the ultraviolet source and the optical analyzer are at the start of their gradual movement from left to right.

FIG. 5 illustrates the circuitry in the optical analyzer and shows in detail how it cooperates with the recorders. A lens 22 is mounted in the end of the optical analyzer and collects the light, beaming it on the reflection filter 23. The reflection filter 23 separates out the red light which is focused on the photo-multiplier tube 24 and reflects the remaining blue and yellow light to the reflection filter 25. The reflection filter 25 reflects the yellow light which is focused on the photomultiplier tube 27 and the remaining blue light is passed by the filter 25 to focus on the photo-multiplier tube 26. The photomultiplier tubes 24, 26 and 27 each give off a signal current which is proportional to the intensity of the light focused upon these photo-multiplier tubes. Each photo-multiplier tube is connected to a source of DC power on line 28 through the resistors 29, 30 and 31. Since the light from fluorescing minerals is pulsed at 1,000 cycles per second, the current produced by this light will also be pulsed at 1,000 cycles per second. This AC output current from each photo-multiplier tube results in a voltage being produced across resistors 29, 30 and 31. This voltage is coupled through capacitors 32, 33 and 34 to the preamplifiers 35, 36 and 37. The outputs from the preamplifiers are proportional to the intensity of the light which is focused on the photo-multiplier tubes 24, 26 and 27, and which results in an AC signal. The outputs from the preamplifiers are applied to the high pass filters 38, 39 and 40. The filters 38, 39 and 40 eliminate all frequencies below 1,000 cycles per second in the signal voltages. As a result, noise signals caused by light other than the light produced by the fluorescent material are greatly reduced. The outputs from the filters are applied to a plurality of second amplifiers 41, 42 and 43, and the outputs from these amplifiers are applied to the three recorders 44, 45 and 46, where the intensity of red, yellow and blue light is respectively recorded.

The DC source of power on line 28 is also connected through the switch 21 and through the capacitor 47 to the recorder 48. The switch 21 is operated by the cam 20 which was described with respect to FIGS. 3 and 4. The recorder 48 records a pulse each time the switch 21 is closed. When the ultraviolet beam is on the left-hand side impinging the area 60 (FIG. 2) the switch 21 is closed, thereby causing the recorder 48 to record a pulse at this time. The record from the recorder 48 enables the observer to analyze results from the recorders 44, 45 and 46 and determine from what part of the scanned surface the particular results came.

From the record made by this apparatus, the prospector can tell what minerals fluoresced to produce the records by analyzing the various colors and their intensities, and can also tell where the minerals are located from the flight plan of the aircraft and from the record made by the recorder 48. In this manner, the prospector would be able to locate and identify the outcroppings of veins of valuable mineral ores and thus locate valuable ore deposits.

The submarine hunter in a similar manner would be able to find the path of an otherwise undetectible submarine and thus be able to locate the submarine. In the case of the submarine hunter it would be preferable that the outputs from the amplifiers 44, 45 and 46 be applied to some visual indicating apparatus so that the submarine hunter can immediately tell when he detects a submarine path.

A further modification of this invention would use two sources of ultraviolet light and pulsing the two sources alternately so that the one source gives off light for one period followed by a period in which no light is given off, and then the second source of light would give off another pulse of ultraviolet light for the next period followed by a second period in which no light is given off. The two sources would emit different wave lengths of ultraviolet light, one source emitting a wave length of 2,537 angstroms and the other source emitting a wave length of 3,660 angstroms. The pulsed light from these two sources would be interlaced. Preferably, these two sources of light would be mounted in the same reflector and the remainder of the apparatus would be exactly the same as disclosed, except that the filters 38 through 40 would have to be high pass filters of 500 cycles per second rather than 1,000 cycles per second. With respect to the first modification, the remaining circuitry shown in FIG. 5 would be the same and the oscillating mechanism shown in FIGS. 3 and 4 would be the same.

It is to be understood that the above description of the invention is only for the purpose of presenting a preferred embodiment and the invention is only to be limited as defined in the appended claims.

What is claimed is:

1. A method of detection in the pressure of ambient light comprising the steps of beaming a source of ultraviolet light pulsed at a predetermined frequency upon a surface under scrutiny from an aircraft, scanning the beam of ultra-violet light in a direction perpendicular to the travel of said aircraft, detecting visible light emanating from said surface, and eliminating the effect of light whose intensity varies at a rate below said predetermined frequency from light detected in said step of detecting visible light.

2. A device for detecting the fluorescent properties of a surface comprising a source of ultraviolet light pulsed at a predetermined frequency and located in a vehicle moving with respect to said surface for irradiating said surface with said ultraviolet light, means for moving said source in an arcuate path relative to said vehicle, means for detecting visible light emanating from said surface in response to the said irradiation of said surface, and means for eliminating the effect of light detected by said means for detecting visible light whose intensity varies at a rate below said predetermined frequency.

3. A device as is recited in claim 2 wherein means are provided to spectrally divide the visible light to be detected.

4. A device according to claim 3 wherein means are provided for recording the intensity of the light whose intensity varies at a rate not less than said predetermined frequency detected by said means to detect visible light.

5. A device according to claim 2 wherein means are provided for recording the intensity of the light whose intensity varies at a rate not less then said predetermined frequency detected by said means to collect visible light.

6. A device for detecting the fluorescent properties of a surface, said device comprising an aircraft, a source of ultraviolet light pulsed at a predetermined frequency mounted on said aircraft for irradiating said surface with said ultraviolet light, means for moving said source in an arcuate path relative to said vehicle, means for detecting visible light emanating from said surface in response to the said irradiation of said surface mounted on said aircraft, and means for eliminating the effect of light detected by said means for detecting visible light whose intensity varies at a rate below said predetermined frequency.

* * * * *